METHOD OF FORMING HOLLOW PLASTIC ARTICLES
Original Filed March 3, 1954 5 Sheets-Sheet 1
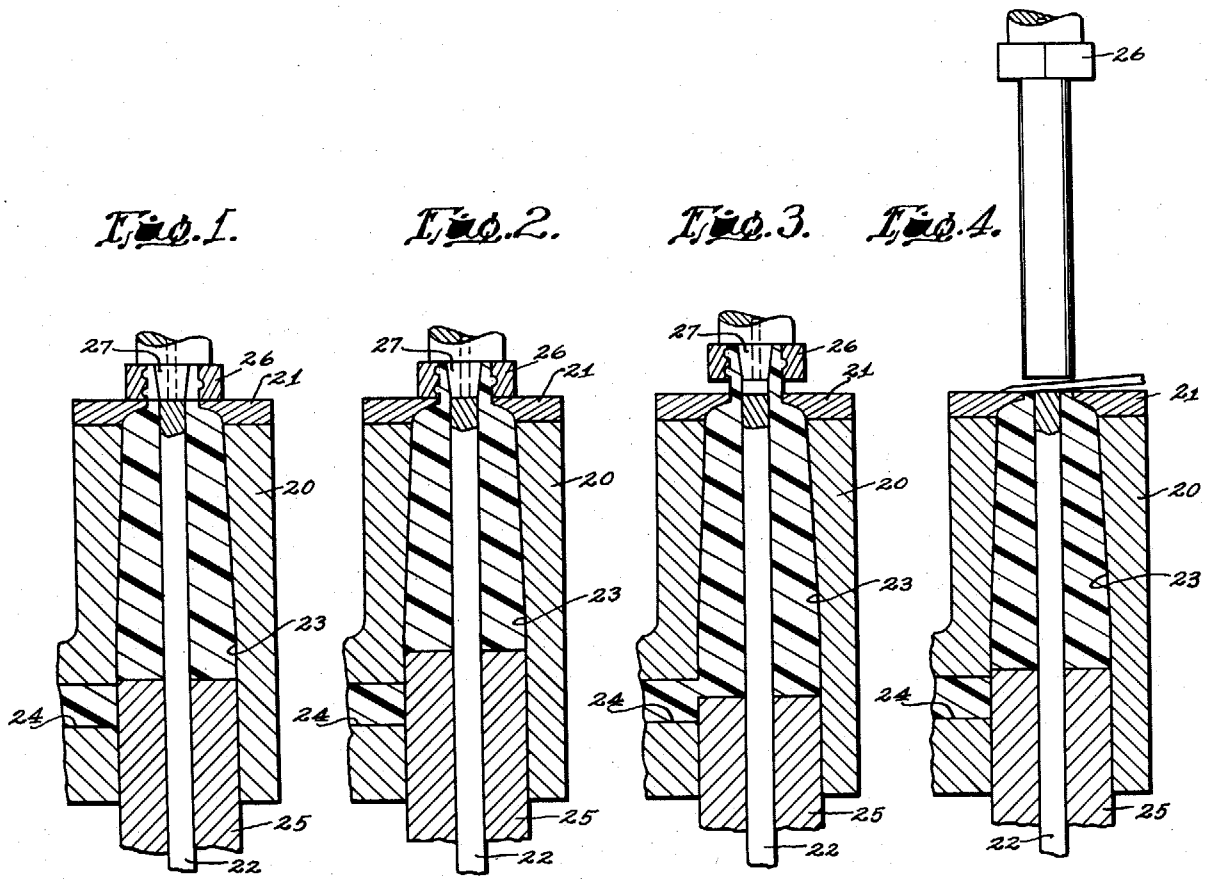
INVENTOR.
ORVILLE B. SHERMAN
BY W A Schaich
B C Fussiamer
ATTORNEYS METHOD OF FORMING HOLLOW PLASTIC ARTICLES
Original Filed March 3, 1954 5 Sheets-Sheet 2
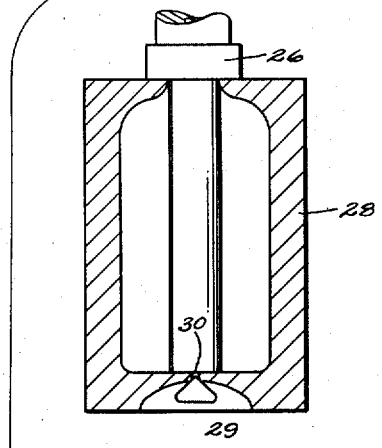
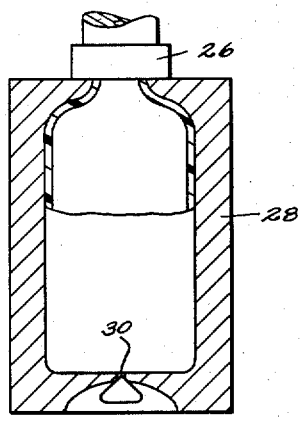
Fig. 6.
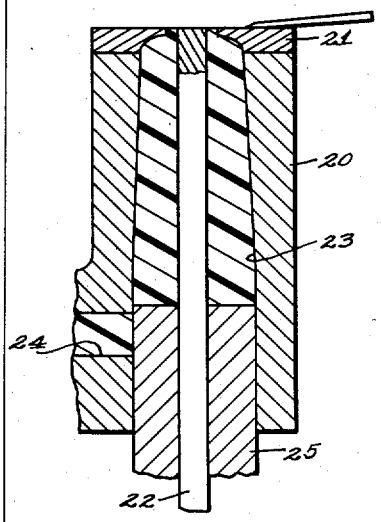
Fig. 5.
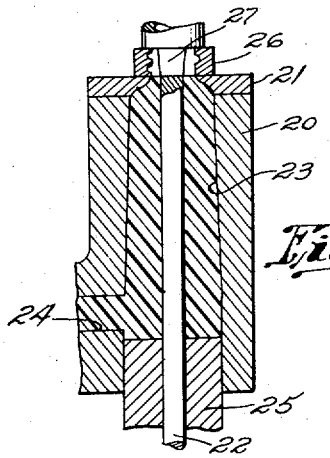
Fig. 5a
INVENTOR.
ORVILLE B. SHERMAN
BY W. A. Schaich
B. C. Fourniaud
ATTORNEYS METHOD OF FORMING HOLLOW PLASTIC ARTICLES
Original Filed March 3, 1954 5 Sheets-Sheet 3
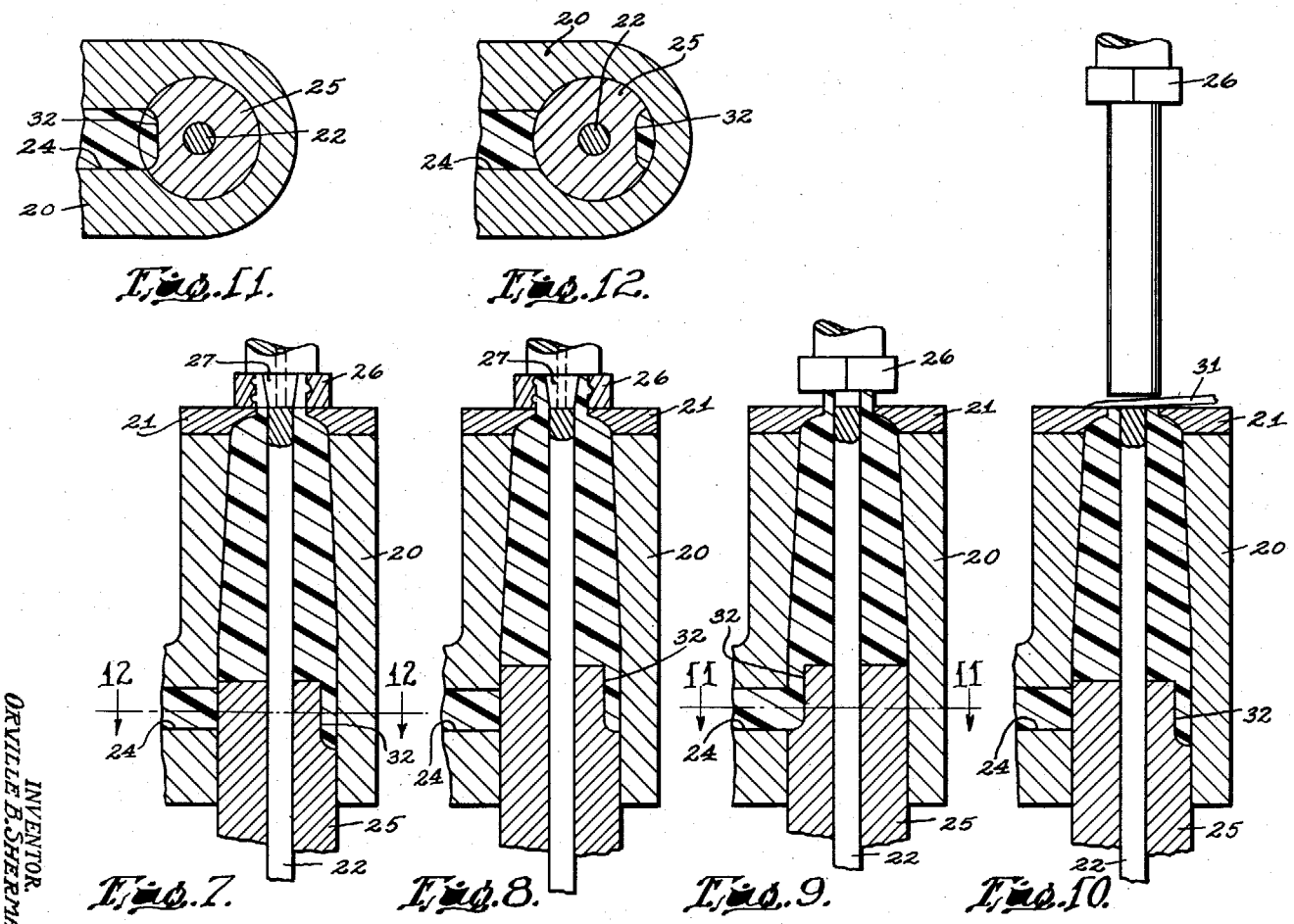
INVENTOR.
ORVILLE B. SHERMAN
BY W. A. Schaich
+
B. C. Toussiano
ATTORNEYS

METHOD OF FORMING HOLLOW PLASTIC ARTICLES

Original Filed March 3, 1954 5 Sheets-Sheet 4

INVENTOR.
ORVILLE B. SHERMAN
BY W. A. Schaich
+
B. C. Tonsiancs
ATTORNEYS

METHOD OF FORMING HOLLOW PLASTIC ARTICLES

Original Filed March 3, 1954 5 Sheets-Sheet 5

INVENTOR.
ORVILLE B. SHERMAN
BY W A Schaich
B C Fusciano
ATTORNEYS

United States Patent Office

Re. 24,784
Reissued Feb. 16, 1960

24,784

METHOD OF FORMING HOLLOW PLASTIC ARTICLES

Orville B. Sherman, West Orange, N.J., assignor to Owens-Illinois Glass Company, a corporation of Ohio Original No. 2,804,654, dated September 3, 1957, Serial No. 413,855, March 3, 1954. Application for reissue September 12, 1958, Serial No. 761,281

12 Claims. (Cl. 18—55)

Matter enclosed in heavy brackets [ ] appears in the original patent but forms no part of this reissue specification; matter printed in italics indicates the additions made by reissue.

This invention relates to a method of forming hollow plastic articles and particularly to a method of forming articles having a neck finish and made of organic plastic material.

According to one method of forming hollow plastic articles, a blank comprising a neck finish with an integral length of tubing is formed and subsequently expanded to the confines of a mold by applying fluid under pressure.

It is an object of this invention to provide a novel method of forming such a blank, comprising a neck finish and integral length of tubing, wherein the dimensions of the neck finish are accurately and uniformly controlled.

It is a further object of this invention to provide such a method wherein such a blank may be formed rapidly with the elimination of flash and other waste during the forming.

Other objects of the invention will appear hereinafter.

Basically, the invention comprises extruding a measured quantity of plastic material into a tubular open-ended cavity through an opening in communication with a source of plastic under pressure, isolating the measured quantity of plastic in the tubular cavity from the parent mass of plastic, applying a force to the isolated quantity to force a portion thereof to move into a neck mold overlying the end of the cavity, re-establishing communication of the plastic in the cavity with the parent mass, forming a length of tubing integral with the neck finish by moving the neck mold away from the tubular cavity and simultaneously supplying plastic material to the tubular cavity from the parent mass, thereby forcing plastic material out of the cavity and simultaneously replenishing the plastic material in the cavity, isolating the plastic in the cavity from the parent mass, and severing the neck finish with the integral length of tubing from the plastic material in the cavity. The completion of the severing step leaves the tubular cavity filled with plastic and in position for application of pressure to force plastic material into a neck mold and thereby again begin the cycle of steps.

Referring to the accompanying drawings:

Figs. 1 through 6 inclusive are sectional elevational views of an apparatus for performing the method, showing the parts in different positions corresponding to various steps of the method;

Figs. 7 through 10 and 13, 14 and 15 inclusive are sectional elevational views of another apparatus for performing the method, showing the parts in different positions corresponding to the various steps in the method;

Fig. 11 is a sectional view at the line 11—11 of Fig. 9;

Fig. 12 is a sectional view at the line 12—12 on Fig. 7;

Figures 13, 14, 15:
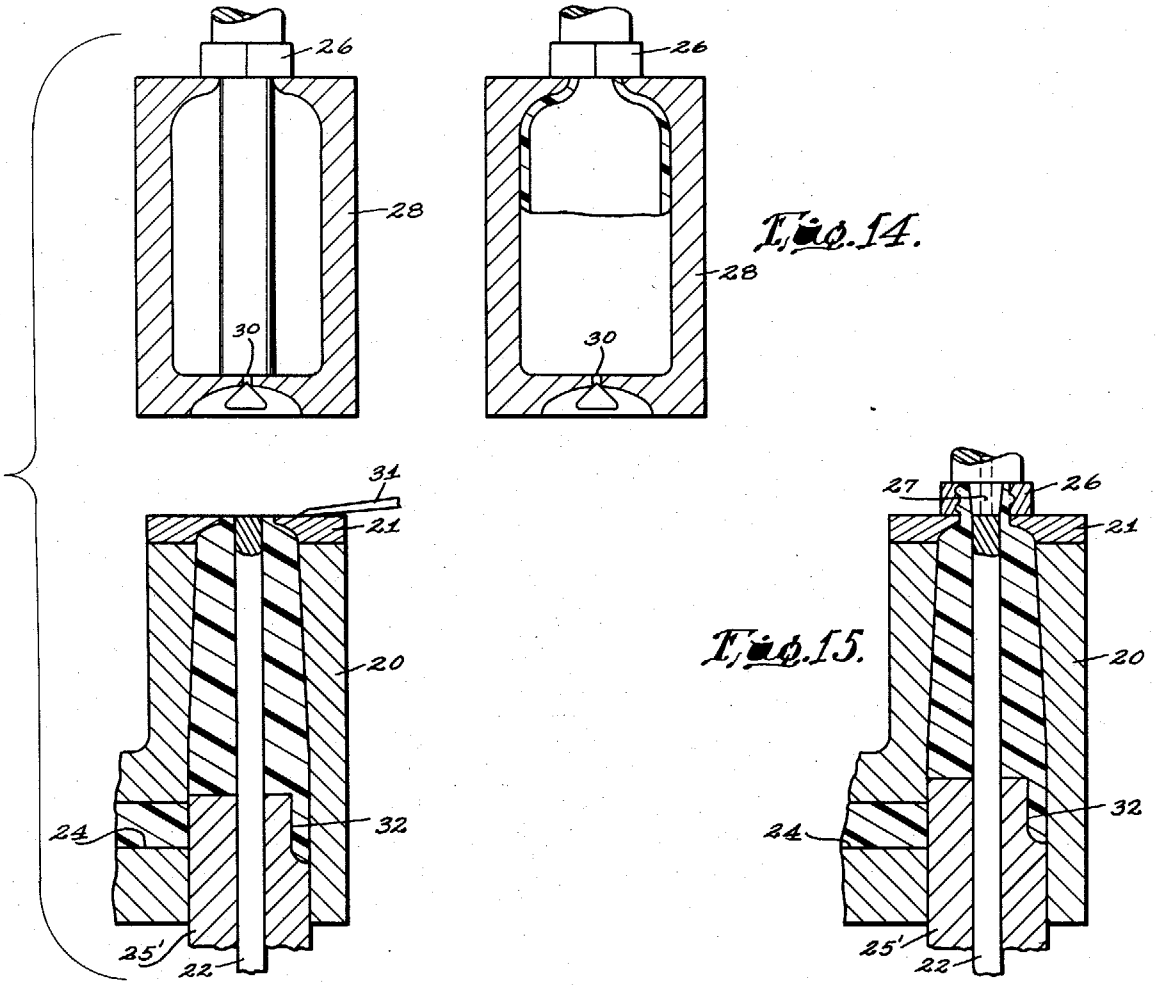

As shown in Figs. 1 through 6, an apparatus for performing the method includes a body 20 having a vertical opening therethrough and an orifice ring 21 overlying the vertical opening. A mandrel 22 is positioned in the opening thereby forming a tubular cavity 23. The tubular cavity 23 is in communication with the outlet of a plasticizer and extruder (not shown) through a channel 24.

A sleeve 25 surrounds the mandrel 22 and is reciprocable by means (not shown) from a position above and overlying the channel 24 to a lower position whereby the tubular cavity 23 may be brought into and out of communication with the channel 24.

A partible neck mold 26 and a hollow core 27 are mounted above the body 20 for axial movement into and out of alignment with the open end of the cavity 23. A partible finishing mold 28 (Figs. 5 and 6) is provided for expanding the plastic to finish form, as hereinafter described. The bottom of the mold sections are beveled at 29 and spaced apart as 30 in order to pinch the plastic material and seal the end thereof.

At the beginning of the operation of the apparatus shown in Figs. 1 through 6, a quantity of plastic material sufficient to fill the tubular cavity is introduced from the source of plastic through the channel 24 to the cavity. The mass of plastic material in the tubular cavity is isolated from the parent mass of plastic material by movement of the sleeve 25 upwardly across the channel 24. The apparatus is then in position for the beginning of the cycle and the neck mold 26 is brought into contact with the body 20, the core 27 contacting the mandrel 22 (Fig. 1).

The sleeve 25 is then moved upwardly under controlled pressure a sufficient distance to force a portion of the plastic material in the tubular cavity upwardly in order to fill the neck mold 26 and form the finish of the article (Fig. 2). The sleeve 25 is then retracted downwardly to re-establish communication with the plastic material (Fig. 3). Simultaneously the neck mold is moved upwardly and axially away from the end of the cavity. The pressure of plastic material from the parent mass forces plastic material into the tubular cavity. A portion of the plastic material in the cavity 23 is displaced out of the open end of the cavity, thereby forming a length of tubing integral with the neck. As the desired length of tubing is formed, the sleeve is again moved upwardly to cut off or resegregate the parent mass from the plastic material in the tubular cavity. A shear blade 31 is then moved across the orifice to sever the length of tubing from the plastic material in the tubular cavity (Fig. 4).

The sections of the hollow mold 28 may then be closed about the plastic material, thereby pinching the lower end of the tubing. The tubing may then be expanded to the confines of the mold by applying fluid under pressure through the hollow core 27 (Figs. 5 and 6).

After the tubing has been severed from the plastic material in the cavity (Fig. 4), the apparatus is again in position for beginning the cycle by bringing a neck mold into contact with the body 20 and forming the neck finish by moving the sleeve 25 upwardly.

A modification of the method may be performed by retracting the sleeve 25 at the beginning of the cycle as shown in Fig. 5a to permit a limited quantity of plastic to enter the tubular cavity and then moving the sleeve upwardly, simultaneously isolating the quantity of plastic in the tubular cavity and forcing plastic into the neck mold positioned over the cavity as shown by Figs. 2 and 8. The sleeve is then retracted and the neck mold moved axially away from the cavity to form a length of tubing integral with the neck, in the same manner as heretofore described. As the desired length of tubing is formed the sleeve is again moved upwardly as in Fig. 4, or rotated as in Fig. 10 to isolate or resegregate the plastic material in the cavity and the length of tubing is severed. The cycle of operations could then again be started by the retraction of the sleeve.

Another apparatus for performing the method is shown in Figs. 7 through 15, inclusive. In this apparatus the sleeve 25' is provided with a slot or groove 32 extending longitudinally along the outer surface of the sleeve to the upper end thereof. In the operation of this apparatus the tubular cavity is initially filled with plastic material as in the form of the apparatus shown in Figs. 1 through 6. The sleeve 25' is in the position shown in Fig. 7 wherein the plastic material in the tubular cavity is isolated or segregated from communication with the parent mass and the groove 32 is in a position out of communication with the channel 24 (Fig. 12). The sleeve 25' is then moved upwardly to force plastic material into the neck mold, thereby forming the neck finish (Fig. 8). The sleeve is then rotated to bring the groove 32 into communication with the channel 24 thereby permitting plastic material to flow from the parent mass to the tubular cavity (Figs. 9, 11). Simultaneously with this action the neck mold is moved axially away from the cavity thereby forming a length of tubing integral with the neck finish by the flow of plastic material out of the tubular cavity. During the forming of the tubing the sleeve is retracted into its lower position. As the desired length of tubing is formed, the sleeve is again rotated to bring the groove 32 out of register with the channel 24 isolating or resegregating the plastic material in the cavity from the parent mass (Fig. 10).

The neck finish and integral tubing may then be severed (Fig. 10) and sealed and expanded, as shown in Figs. 13 and 14, by closing the mold sections and supplying fluid under pressure through the core.

At the severing of the tube from the material in the tubular cavity, the various parts are again in position for application of pressure to the mass of plastic in the tubular cavity to force plastic out of the tubular cavity and once again begin the cycle of forming a hollow plastic container.

Figure 16:
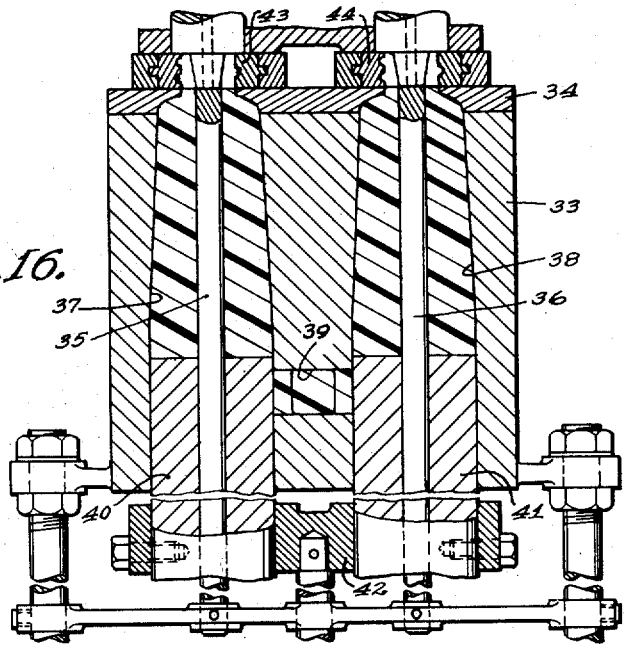
Fig. 16 is a part sectional elevational view of an apparatus for performing the method.
Figure 17:
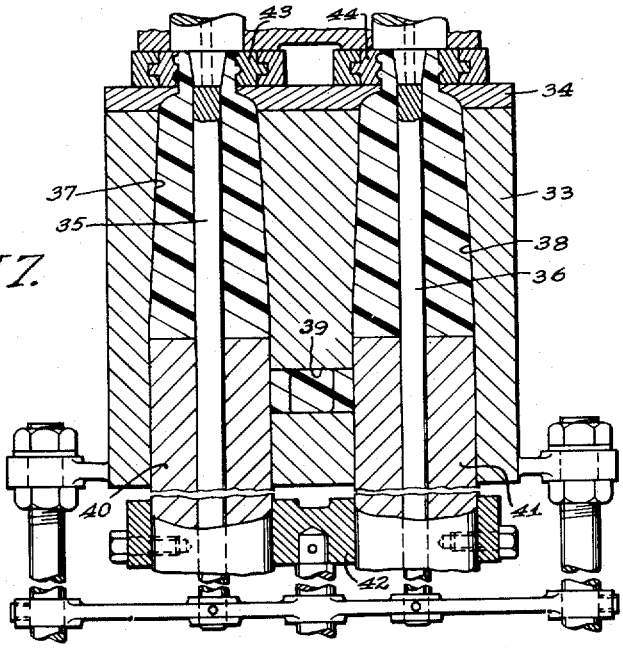
Fig. 17 is a part sectional elevational view of the apparatus shown in Fig. 16 with the parts in the position obtaining at the completion of the injection operation.

Figs. 16 and 17 show an apparatus for making a multiplicity of hollow articles at the same time. For example, as indicated in Figs. 2 and 15, the sleeves 25 and 25' respectively, are shown as having been moved upwardly to injection mold the neck portions of the next succeeding article. The apparatus in Fig. 16 may be used to form articles according to the method shown in Figs. 1 through 6. The apparatus includes a body 33 having two vertical openings therethrough and an orifice plate 34 also provided with two openings in register with the openings in the body. Mandrels 35, 36 are positioned in the openings forming cavities 37, 38, respectively. The cavities 37, 38 are in communication with the outlet of a plasticizer and extruder (not shown) through channel 39. Sleeves 40, 41 are mounted on cross-arm 42 which may be reciprocated to reciprocate the sleeves within the cavities.

Partible neck molds 43, 44 are positioned for movement into and out of register with the tubular cavities.

As shown in Fig. 16 the parts are in position for the beginning of the cycle with the tubular cavities having plastic material therein. Fig. 17 shows the movement of the sleeves upwardly to force plastic material into the neck molds. The cycle of operations would be conducted in the same manner as in the operations shown in Figs. 1 through 6 inclusive.

An important advantage of the improved method of forming hollow plastic articles is that the tubular cavity is always filled with plastic material and the entrapment of air is entirely eliminated, resulting in a more uniform plastic article.

A further advantage is that the formation of the neck finish is accomplished under controlled pressure supplied by the sleeve. This pressure may be more uniformly and accurately controlled than it is possible to obtain through any effort to control the pressure upon the plastic as generated by the parent extrusion device. In addition this controlled pressure, because of its more direct and effective application, may be of a much lesser degree of force than that which is normally supplied by the parent extrusion device.

The invention has been described as being applied to organic plastic materials. The terms plastic and thermoplastic, as used herein, define any organic material which has the required condition of plasticity to permit expansion and setting in predetermined form.

The terms tubular and tubing, as used herein, are intended to include any hollow shapes in which plastic material may be formed including non-circular and irregular shapes.

Modifications may be resorted to within the spirit and scope of the appended claims.

I claim:

1. The method of forming preliminary blanks of plastic molding material for the production of hollow plastic articles which comprises the steps of providing a parent body of plastic material in workable condition, segregating from said parent body and in an open end chamber a measured quantity of such molding material, applying pressure to one end of said segregated quantity of material to mold a finished portion on and integral with the opposite end of said quantity, simultaneously releasing said molding pressure upon and ending the segregation of said quantity of material, simultaneously injecting new material into one end of said chamber while extruding material from the opposite end thereof, the material leaving said chamber being in hollow tube form and integral with said previously molded finished portion, segregating the said new material in the chamber from said parent body of material, and severing the extruded tube formation from said new segregated material.

2. The method of forming preliminary blanks of plastic molding material for the production of hollow plastic articles which comprises the steps of providing a parent mass of plastic material in moldable condition, simultaneously segregating from said parent body and in an open end chamber a measured quantity of such molding material and applying localized pressure to one end of said segregated quantity of material to mold a finished portion integral with the opposite end thereof, concurrently releasing said localized pressure upon and ending the segregation of said quantity of material, simultaneously extruding further material into one end of said chamber and out of the opposite end of said chamber, the material leaving said chamber being in hollow tube form and integral with said molded finished portion, resegregating the material in the chamber from said parent body of material, and severing the extruded tube formation with its said molded portion from said resegregated material.

3. The method of forming preliminary blanks of plastic molding material for the production of hollow plastic articles which comprises the steps of providing a parent body of plastic material in workable condition, concurrently segregating from said parent body a measured quantity of such molding material into an open ended chamber, molding a finished portion on and integral with the opposite end of said segregated quantity of workable plastic material, ending the segregation of said quantity of material, extruding further material into one end of said chamber while extruding other material from the opposite end of said chamber, the material leaving said chamber in hollow tube form and being integral with said molded finished portion, resegregating the material in the chamber from said parent body of material, and severing the extruded tube formation with its said molded portion from said resegregated material.

4. The method of forming preliminary blanks of plastic molding material for the production of hollow plastic articles which comprises the steps of molding a finished portion on and integral with an exposed end of a segregated quantity of workable plastic material, ending the segregation of said quantity of material, extruding further material into one end of said chamber while extruding the segregated material from the opposite end of said chamber, the material leaving said chamber in hollow tube form and being integral with said molded finished portion, resegregating the material in the chamber from said parent body of material, severing the extruded tube formation with its said molded portion from said resegregated material, and repeating the several steps.

5. The method of forming preliminary blanks of plastic moldable material for the production of hollow plastic articles which comprises the steps of providing a segregated measured quantity of workable plastic material in an open end chamber, molding a hollow finished portion on and integral with the material exposed by the said open end of said chamber, ending the segregation of said material, extruding further material from the parent body thereof into one end of said chamber while extruding the segregated material from the open end of said chamber, the material being extruded from said chamber being in a hollow form integral with and continuing the hollow formation of said molded finished portion, resegregating the material in the chamber from said parent body, severing the extruded hollow tube formation from said resegregated material and repeating the several steps.

6. The method of forming preliminary blanks of plastic moldable material for the production of hollow plastic articles which comprises the steps of providing a segregated measured quantity of workable plastic material in an open end chamber, molding a hollow finished neck portion on and integral with the material exposed by the said open end of said chamber, ending the segregation of said workable plastic material, extruding further material from the parent body thereof into one end of said chamber while extruding the segregated material from the open end of said chamber, the material being extruded from said chamber being in a hollow tube form integral with and continuing the hollow formation of said molded neck portion, resegregating the material in the chamber from said parent body, severing the extruded hollow tube formation from said resegregated material, and repeating the several steps.

*7. A method for forming plastic containers from heated plasticized material which includes the application of pressure from two separate and distinct sources of pressure, said method including the steps of introducing a measured amount of said material from a parent source into a generally tubular cavity open at one end, segregating said measured amount of material from the parent source thereof, molding a finished portion on one end of said measured amount, and moving said molded portion axially away from said tubular cavity while extruding through said open end a hollow tubular formation integral with said molded portion, said molding and said extrusions being obtained through the application of said separate pressures, respectively, in predetermined order.*

*8. A method for forming plastic containers from heated plasticized material and involving the application of a plurality of separate pressures, said method including the steps of first applying a first extrusion pressure to a parent source of said material to thereby extrude a measured amount of the material into a generally tubular cavity, segregating said measured amount of material from said parent source, applying a second injection pressure to injection mold a finished portion on one end of said measured amount, moving said injection molded portion axially away from said tubular cavity while extruding a further portion of said measured material from said tubular cavity, said further extrusion being of hollow tubular formation and integral with said molded portion, the extrusion of said further portion being obtained through the application to said material of a pressure different from said injection pressure.*

*9. A method for forming hollow plastic containers from heated plasticized material to which separate extrusion and molding pressures derived from separate and distinct sources of pressure are applied, said method including the steps of applying an extrusion pressure to a parent body of said material to extrude a measured amount therefrom into a generally tubular cavity open at one end, momentarily segregating the material in said cavity from said parent body thereof, applying a molding pressure to said segregated measured material to mold a finished portion on one end thereof, ending the segregation of said material, and moving said molded portion from said tubular cavity opening while applying pressure to said parent body to extrude therefrom a further tubular formation integral with said molded portion.*

*10. In a method of making a plastic article from heated plasticized material filling a cavity communicating with an annular discharge orifice, the steps of subjecting material in said cavity to an injection molding pressure from a first pressure source to eject material from the cavity into an injection mold communicating with the orifice and immediately adjacent thereto, and thereafter simultaneously moving said mold away from said orifice and applying to said material an extrusion pressure different from said injection molding pressure and from a second source to thereby extrude a tubular extension through said orifice integral with the material filling said injection mold.*

*11. In a method of forming hollow plastic containers from heated plasticized material wherein there is utilized a plurality of pressures derived from separate and distinct sources thereof, said pressures being exerted on such material filling a cavity having an annular discharge orifice, the steps of shaping a finished portion on said material at said discharge orifice by the exertion of a first of said pressures on said material, and thereafter moving said finished portion axially away from said annular discharge orifice while extruding therethrough a tubular plastic formation integral with said finished portion, the extrusion of said plastic formation being accomplished by the exertion of a second of said pressures different from said first pressure and derived from a separate pressure source.*

*12. In a method of forming hollow plastic containers from heated plasticized material wherein there is utilized a plurality of separate and distinct means of pressurizing said plasticized material, the steps of exerting pressure on the material to fill a cavity having an annular discharge orifice, shaping a finished portion on said material at said discharge orifice by the exertion of a first pressure on said material, and subsequently moving said finished portion axially away from said annular discharge orifice while extruding therethrough a tubular plastic formation integral with said finished portion, the extrusion of said plastic formation being accomplished by the exertion of a second pressure different from said first pressure.*

References Cited in the file of this patent or the original patent

UNITED STATES PATENTS

| | | |
|---|---|---|
| 2,262,612 | Kopitke | Nov. 11, 1941 |
| 2,288,454 | Hobson | June 30, 1942 |
| 2,443,053 | Parmelee | June 8, 1948 |
| 2,562,523 | Brunet | July 31, 1951 |